(12) United States Patent
Springett et al.

(10) Patent No.: US 9,404,319 B2
(45) Date of Patent: Aug. 2, 2016

(54) WELLSITE CABLE SUPPORT ASSEMBLY AND METHOD OF USING SAME

(71) Applicant: National Oilwell Varco, L.P., Houston, TX (US)

(72) Inventors: Frank Benjamin Springett, Spring, TX (US); Stephen Bryron Gauntt, Houston, TX (US); Dean Allen Bennett, Houston, TX (US)

(73) Assignee: National Oilwell Varco, L.P., Houston, TX (US)

( * ) Notice: Subject to any disclaimer, the term of this patent is extended or adjusted under 35 U.S.C. 154(b) by 0 days.

(21) Appl. No.: 14/563,988

(22) Filed: Dec. 8, 2014

(65) Prior Publication Data

US 2015/0159443 A1    Jun. 11, 2015

Related U.S. Application Data

(60) Provisional application No. 61/914,849, filed on Dec. 11, 2013.

(51) Int. Cl.
| | | |
|---|---|---|
| A61B 17/80 | (2006.01) | |
| F16L 1/24 | (2006.01) | |
| F16L 1/20 | (2006.01) | |
| E21B 19/00 | (2006.01) | |
| H02G 1/10 | (2006.01) | |
| H02G 9/12 | (2006.01) | |
| H02G 3/04 | (2006.01) | |

(52) U.S. Cl.
CPC .............. *E21B 19/002* (2013.01); *H02G 1/10* (2013.01); *H02G 9/12* (2013.01); *H02G 3/0475* (2013.01)

(58) Field of Classification Search
None
See application file for complete search history.

(56) References Cited

U.S. PATENT DOCUMENTS

| | | | |
|---|---|---|---|
| 7,225,877 B2 | 6/2007 | Yater | |
| 8,922,523 B2 | 12/2014 | Lynch et al. | |
| 2006/0219412 A1 | 10/2006 | Yater | |
| 2007/0029081 A1 | 2/2007 | Shaw | |
| 2008/0295912 A1 | 12/2008 | Louvain-Walters | |
| 2010/0228295 A1* | 9/2010 | Whitefield | E21B 17/017 606/278 |
| 2012/0024412 A1 | 2/2012 | Bertelo et al. | |
| 2012/0168172 A1 | 7/2012 | Litherland et al. | |
| 2013/0014849 A1 | 1/2013 | Glejbol | |
| 2013/0255818 A1 | 10/2013 | Krohn et al. | |
| 2014/0083711 A1* | 3/2014 | Springett et al. | 166/345 |
| 2014/0124079 A1 | 5/2014 | Andersen et al. | |
| 2014/0159361 A1 | 6/2014 | Weir et al. | |
| 2014/0173856 A1* | 6/2014 | Kingston | F16L 1/24 24/285 |
| 2014/0300572 A1 | 10/2014 | Ohlsson et al. | |
| 2014/0377010 A1* | 12/2014 | Van Belkom | F16L 57/02 405/168.1 |
| 2015/0020910 A1 | 1/2015 | Pedersen | |
| 2015/0027580 A1 | 1/2015 | Glejbol | |
| 2015/0059904 A1 | 3/2015 | Nokkentved et al. | |

FOREIGN PATENT DOCUMENTS

| | | |
|---|---|---|
| EP | 0197546 | 10/1986 |
| GB | 2365941 | 2/2002 |
| WO | 2010136801 | 12/2010 |
| WO | 2012168702 | 12/2012 |

OTHER PUBLICATIONS

PCT/US2014/069159 International Search Report and Written Opinion dated May 29, 2015, 12 pages.

* cited by examiner

*Primary Examiner* — Matthew R Buck
*Assistant Examiner* — Douglas S Wood
(74) *Attorney, Agent, or Firm* — JL Salazar Law Firm

(57) ABSTRACT

A cable support, cable support assembly, and method of supporting a cable is disclosed. The cable support includes a body having a base portion and a ball portion with a cable channel to receive a cable therethrough. The body includes a plurality of axial segments movable between an open position to access the cable channel and a closed position to enclose the cable in the channel. The base portion has a cavity to receive the ball portion of another cable support whereby the cable is flexibly supported.

21 Claims, 12 Drawing Sheets

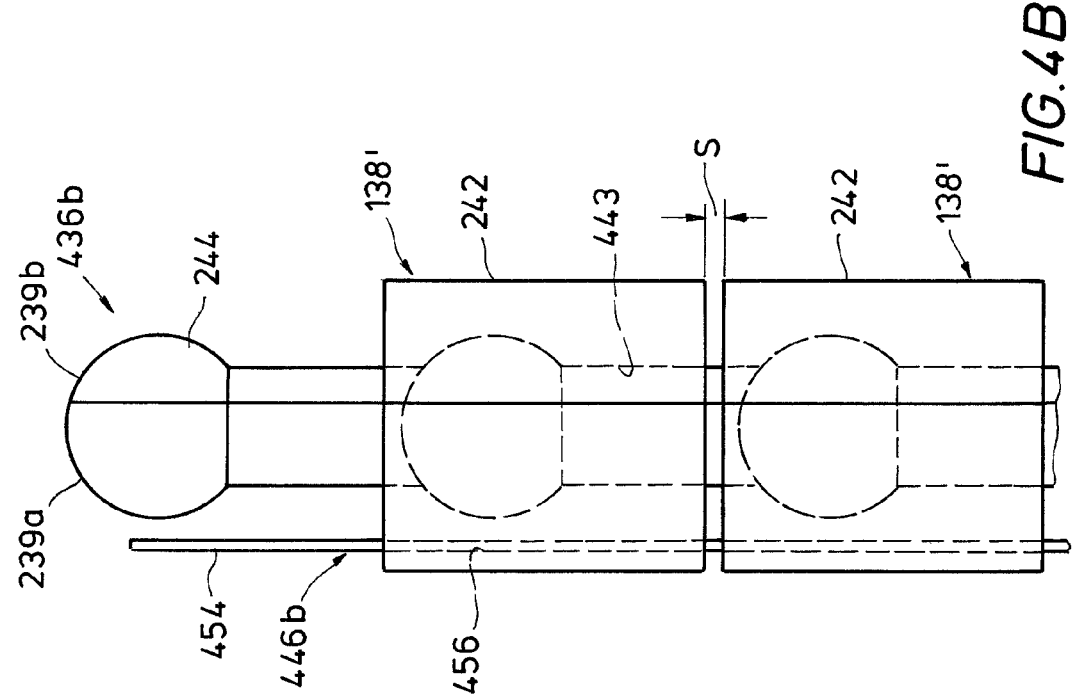
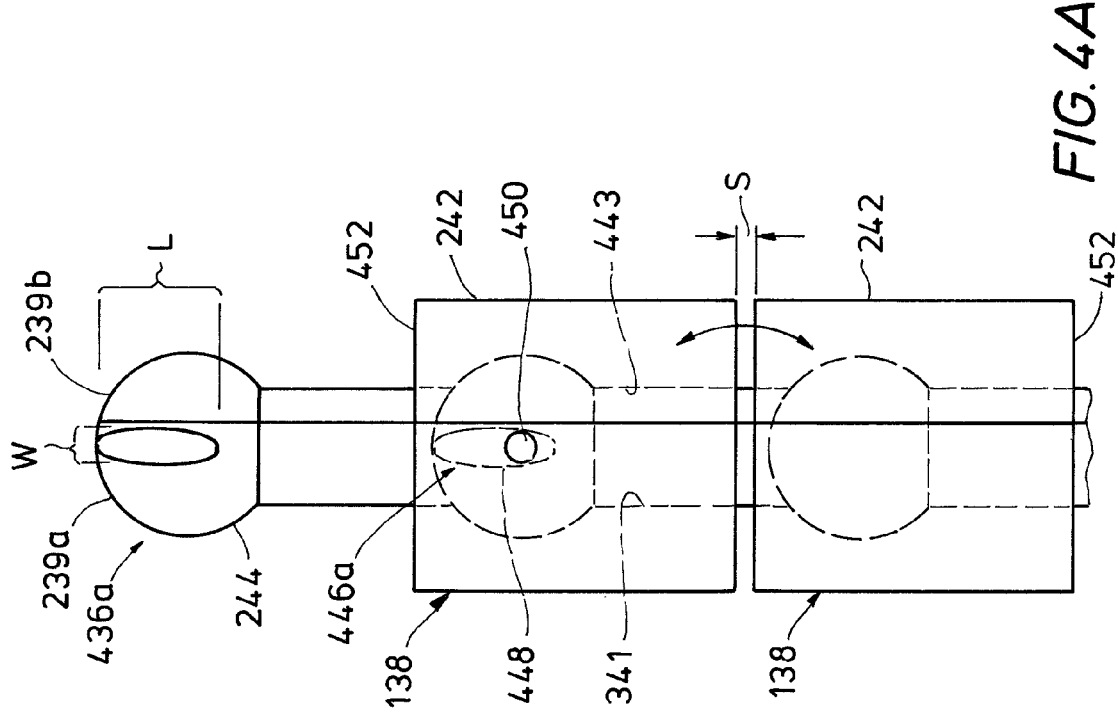

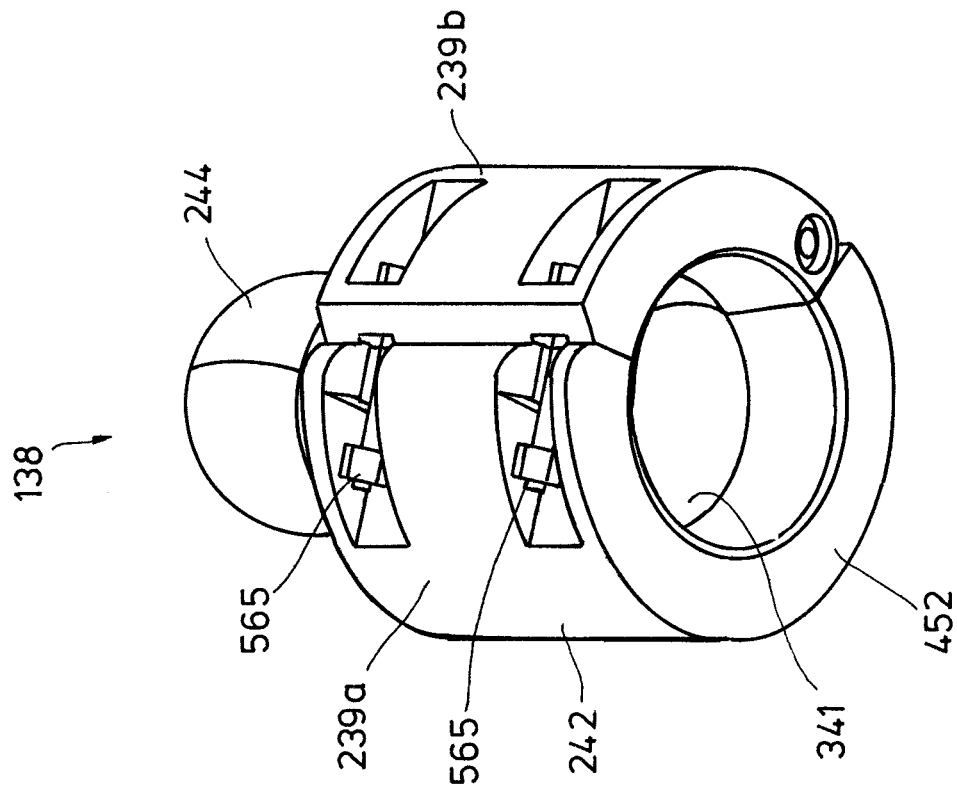
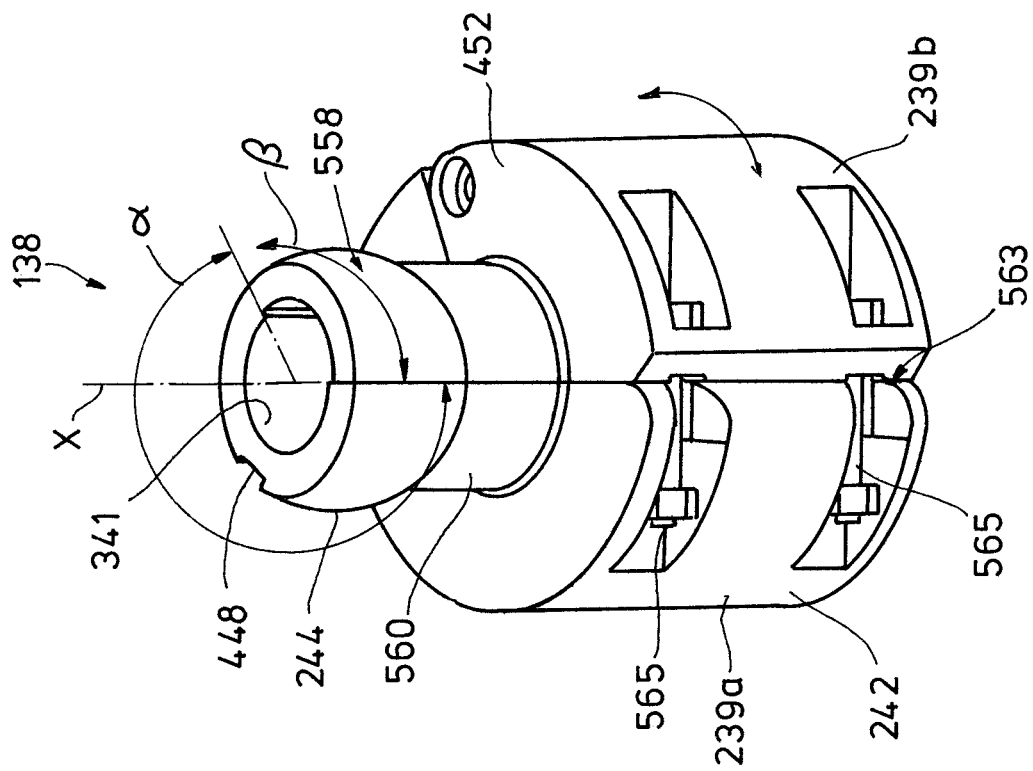

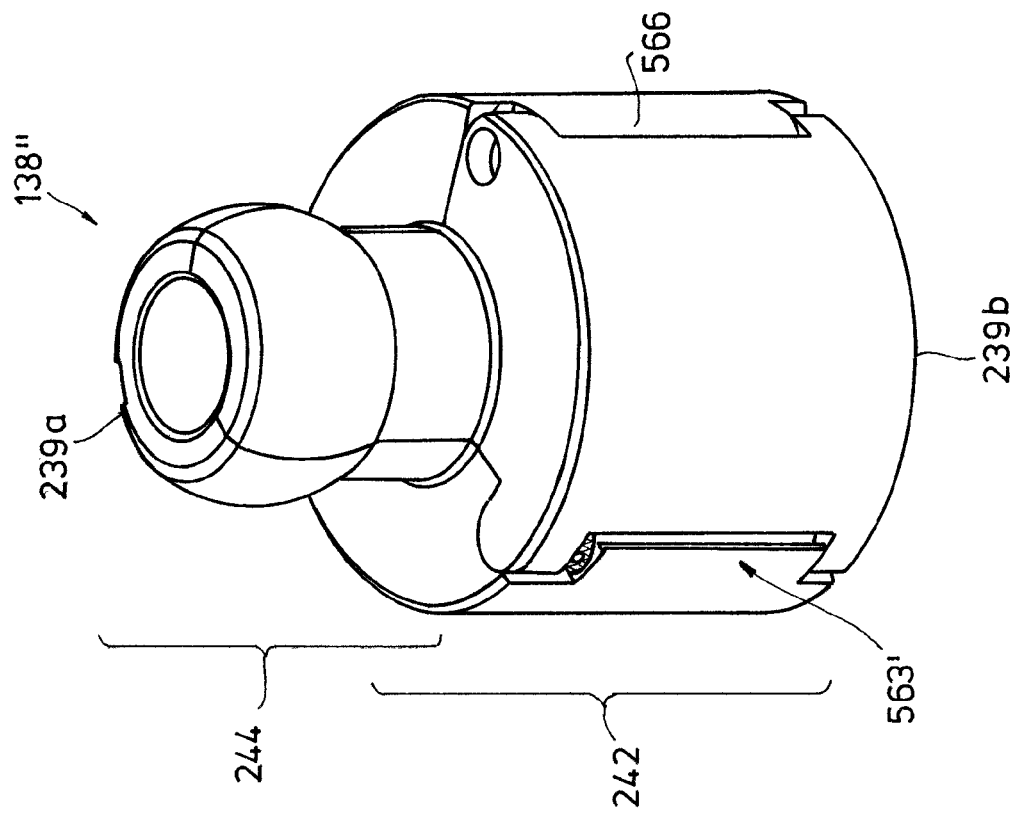
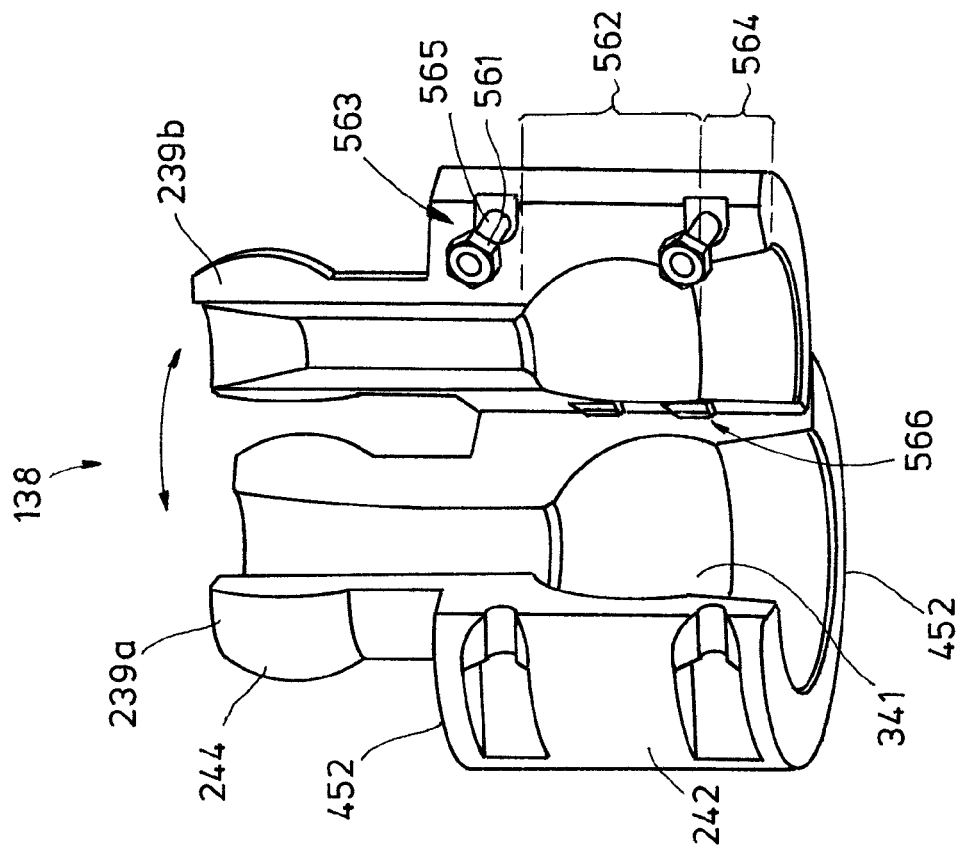
FIG. 5D
FIG. 5C

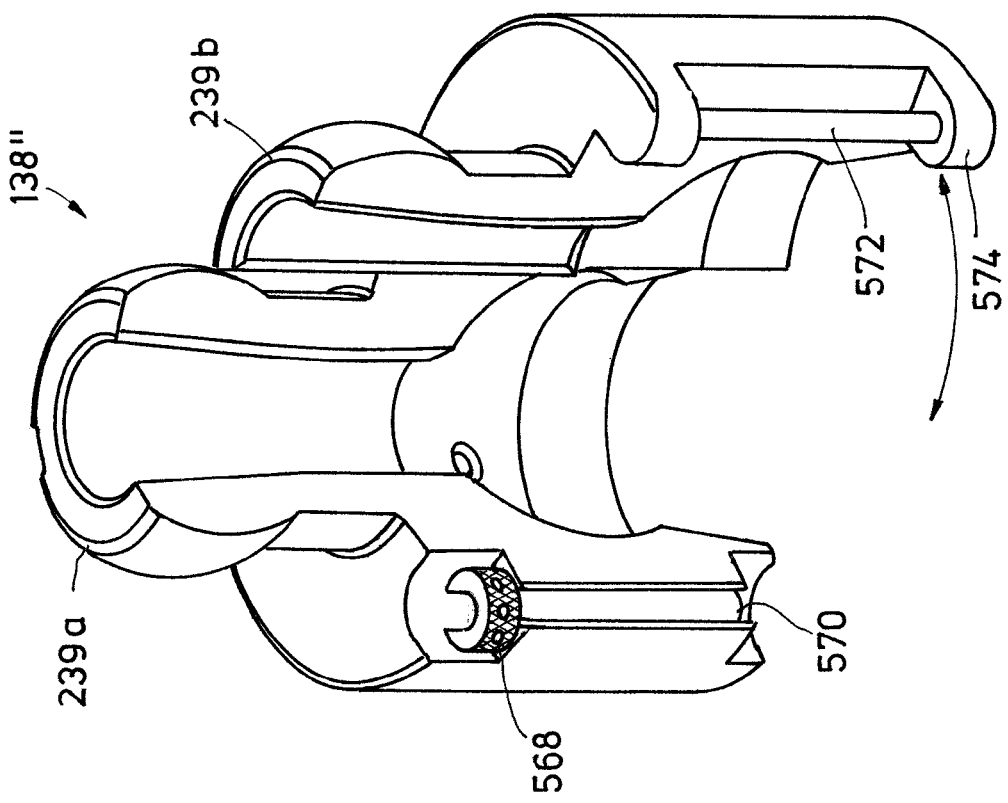
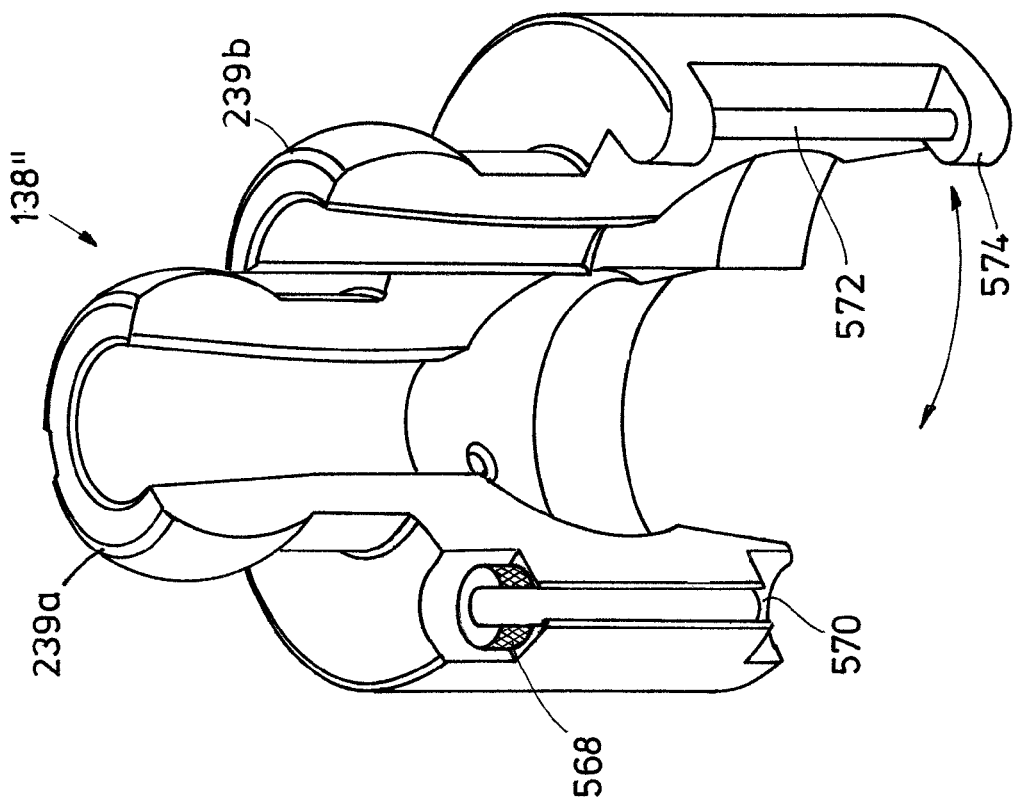

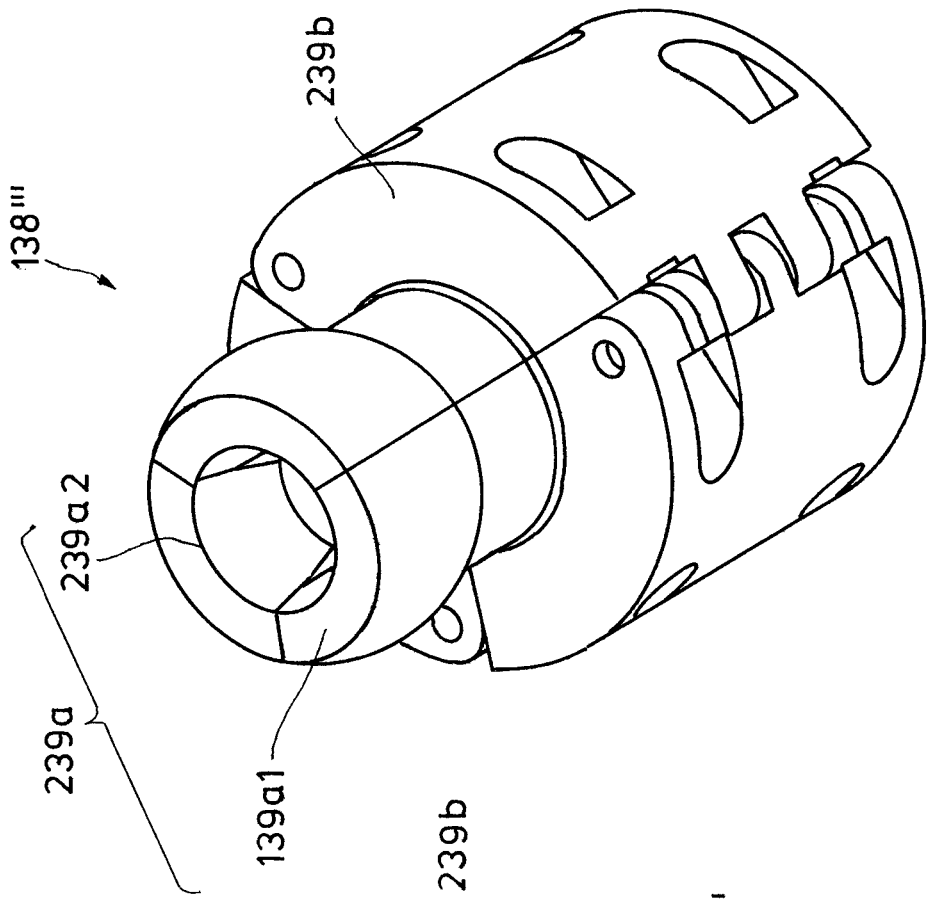
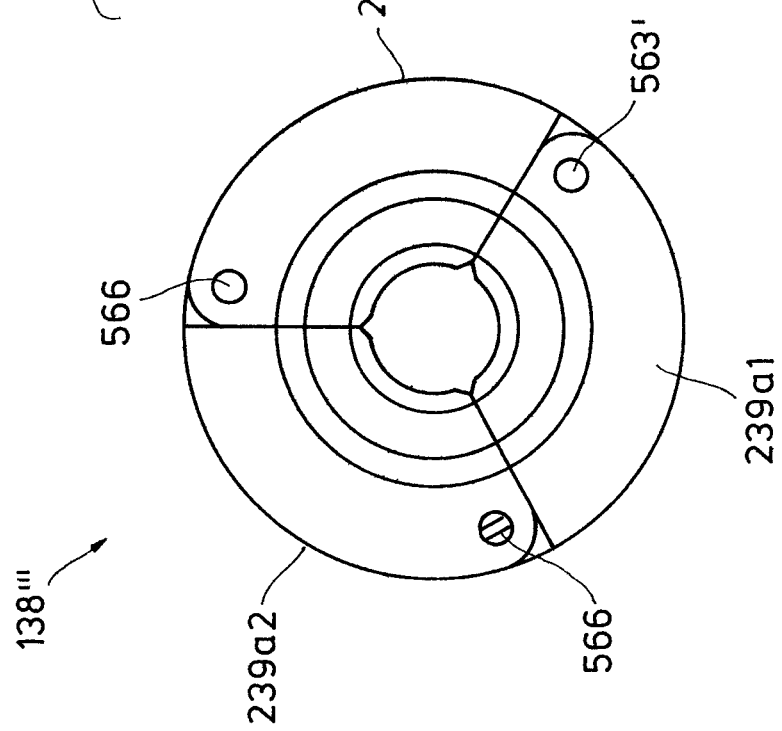

WELLSITE CABLE SUPPORT ASSEMBLY AND METHOD OF USING SAME

CROSS-REFERENCE TO RELATED APPLICATION

The application claims the benefit of U.S. Provisional Application No. 61/914,849, filed on Dec. 11, 2013, the entire contents of which are hereby incorporated by reference herein.

BACKGROUND

The disclosure relates generally to techniques for performing wellsite operations. More specifically, the disclosure relates to devices for supporting (e.g., protecting) cables about the wellsite.

Oilfield operations may be performed to locate and gather valuable downhole fluids. Oilfield operations may be performed at land based or offshore locations. Offshore oilfileld operations may utilize surface platforms with equipment deployed to a subsea wellbore to draw fluids from subsea locations to a surface vessel. Subsea equipment, such as blowout preventers, may be positioned about the subsea wellbore to access fluid from subsurface formations.

Tubulars, such as a riser and cables, may extend from the subsea equipment to the surface platform for passing fluids and/or signals therebetween. The riser may contain tubing for passing fluids, such as produced hydrocarbons, from the wellbore to the surface. Cables, such as choke & kill lines, may also be provided along the riser for providing fluid, communication, and power between equipment at the surface and the subsea equipment.

The tubulars may be provided with devices, such as connectors to connect portions of the riser or to support the cables along the riser. Examples of tubulars and/or devices are provided in PCT Patent Publication Nos. WO2013/022541, WO2013/135244, WO2012/1155912 and WO2013/113316, US Publication Nos. 2013/0014849 and 2006/0219412, and U.S. application Ser. No. 14/354,236, the entire contents of which are hereby incorporated by reference herein.

SUMMARY

In at least one aspect the disclosure relates to cable support positionable about a cable of a wellsite. The cable support includes a body having a base portion and a ball portion with a cable channel to receive a cable therethrough. The body comprises a plurality of axial segments movable between an open position to access the cable channel and a closed position to enclose the cable in the cable channel. The base portion has a cavity to receive the ball portion of another cable support whereby the cable is flexibly supported.

The body has a neck portion between the base portion and the ball portion. The body also includes a key and a keyway, the key interlockingly engageable with the keyway of the another cable support. The key is movable in the keyway to permit movement about the another cable support. The cable support may also include a thread disposable through the body and the body of the another cable support, and/or an aligner operatively connecting the body with the body of the another cable support in a predefined orientation.

The segments may be hingedly connectable along a first axial side and connectable along a second axial side. The segments comprise at least two asymmetrical segments adjoined along the axial sides, and the axial sides may be parallel to an axis of the body. The segments comprise three axial segments, with the three axial segments adjoined along the axial sides, and two of the three axial sides hingedly connected, with one of the three axial sides openable. The cable support further comprises a hinge between the plurality of axial segments. The cable support may also include a lock removably connecting the plurality of axial segments. The lock may comprise bolts removably connecting the axial segments, and/or a rod with a latch removably connecting the plurality of axial segments.

In another aspect, the disclosure relates to a cable support assembly positionable about a cable of a wellsite. The cable support includes a plurality of cable supports. Each of the cable supports comprise a body having a base portion and a ball portion with a cable channel to receive a cable therethrough. The body comprises a plurality of axial segments movable between an open position to access the cable channel and a closed position to enclose the cable in the cable channel. The base portion has a cavity to receive the ball portion of another cable support whereby the cable is flexibly supported.

The cable assembly may further comprise a support connector operatively connectable between the body and a wellsite component. The cable supports may be connectable to form a chain of the plurality of cable supports about the cable. The cable assembly may also include an aligner to align the plurality of cable supports. The cable supports may be openable at one of simultaneously or sequentially.

Finally, in another aspect, the disclosure relates to a method of supporting a cable of a wellsite. The method involves providing a plurality of cable supports comprising a body having a base portion and a ball portion with a cable channel therethrough. The body comprises a plurality of axial segments. The method also involves positioning the ball portion of the plurality of cable supports in the base portion of adjacent ones of the plurality of cable supports, positioning the cable in the cable channel, and enclosing the cable in the cable channel by moving the axial segments to a closed position thereof.

The cable assembly may also include locking the segments in the closed position, and/or moving the axial segments of the cable supports to an open position. The moving may involve opening the segments simultaneously or sequentially.

BRIEF DESCRIPTION DRAWINGS

The appended drawings illustrate example embodiments and are, therefore, not to be considered limiting of its scope. The figures are not necessarily to scale and certain features and certain views of the figures may be shown exaggerated in scale or in schematic in the interest of clarity and conciseness.

FIGS. 4A and 4B are schematic side views of key and threaded versions, respectively, of a cable support assembly depicting adjacent clam segments in an aligned position.

FIGS. 5A-5C depict various views of a clam segments with a bolt lock. FIGS. 5D-5F depict various views of a clam segments with a rotating lock.

FIGS. 6A and 6B are end and perspective views, respectively, of a clam segment with multiple clam portions.

DETAILED DESCRIPTION

Figure 1A:
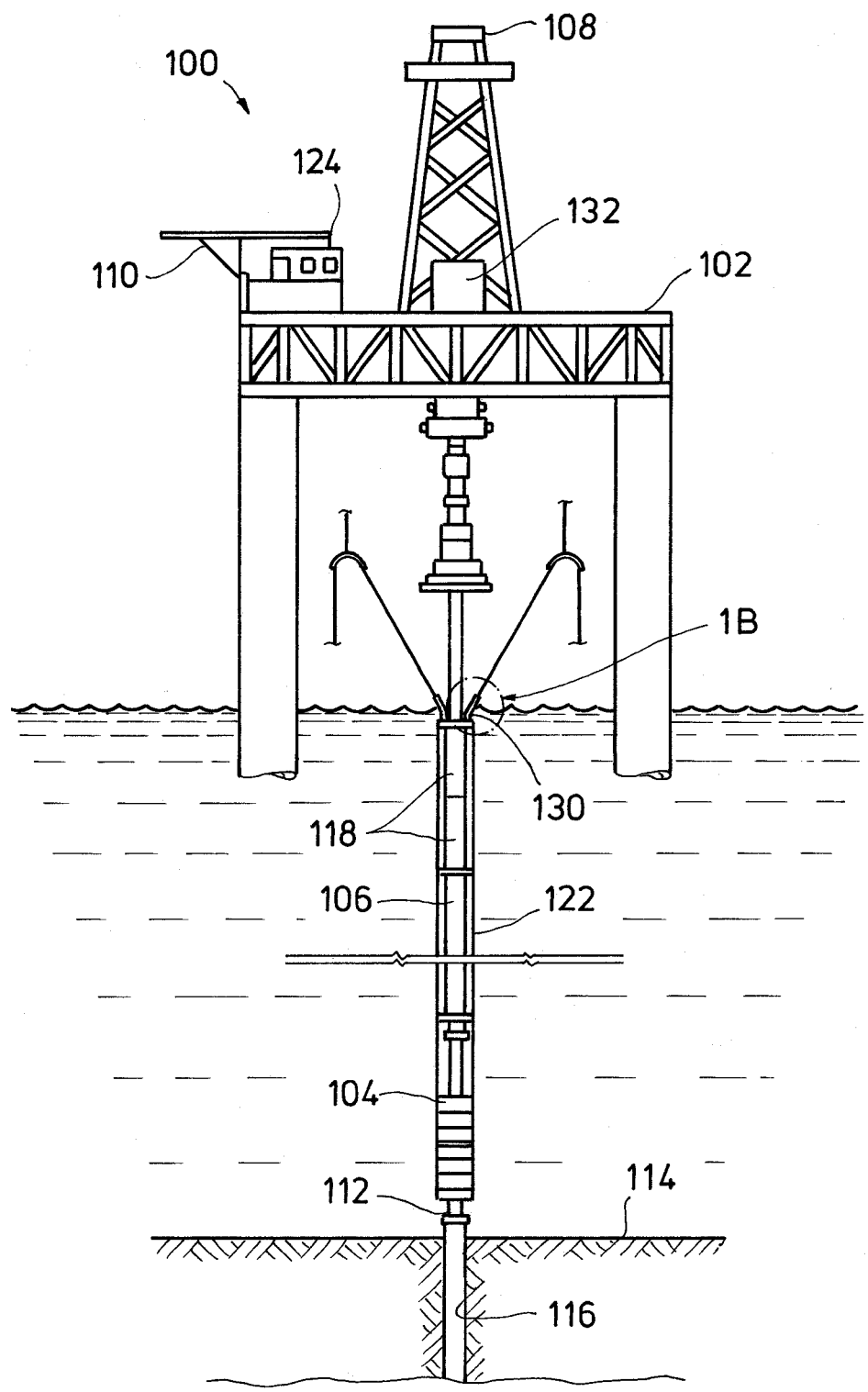
FIG. 1A is a schematic view of an offshore wellsite having a riser and cables extending from a surface platform to subsea equipment.

In the following detailed description, numerous specific details may be set forth in order to provide a thorough understanding of embodiments of the disclosure. However, it will be clear to one skilled in the art when embodiments of the disclosure may be practiced without some or all of these specific details. In other instances, well-known features or processes may not be described in detail so as not to unnecessarily obscure the subject matter. In addition, like or identical reference numerals may be used to identify common or similar elements. It will also be noted that while certain material (e.g., previous provisional patent applications) may be incorporated herein, certain limitations and/or feature contained therein may be broader in the present application.

The present disclosure relates to a cable support assembly for supporting a cable and/or other wellsite tubulars, about a wellsite. The cable support assembly includes a series of ball and socket type cable segments interlockingly connected to form a chain positionable about the cable. The cable segments include offset portions alignable to permit the cable segments to be selectively opened individually or simultaneously. The offset portions may include a larger and smaller portion that close about the cable. An alignment device (or anti-rotation device orienter) may be provided to align the cable segments so that the smaller portion will open and close simultaneously about the larger portion. The interlocking configuration and simultaneous opening of the cable segments may be used to provide quick assembly of the cable support assembly about a cable, and/or quick insertion and/or removal of the cable therefrom.

Figure 1B:
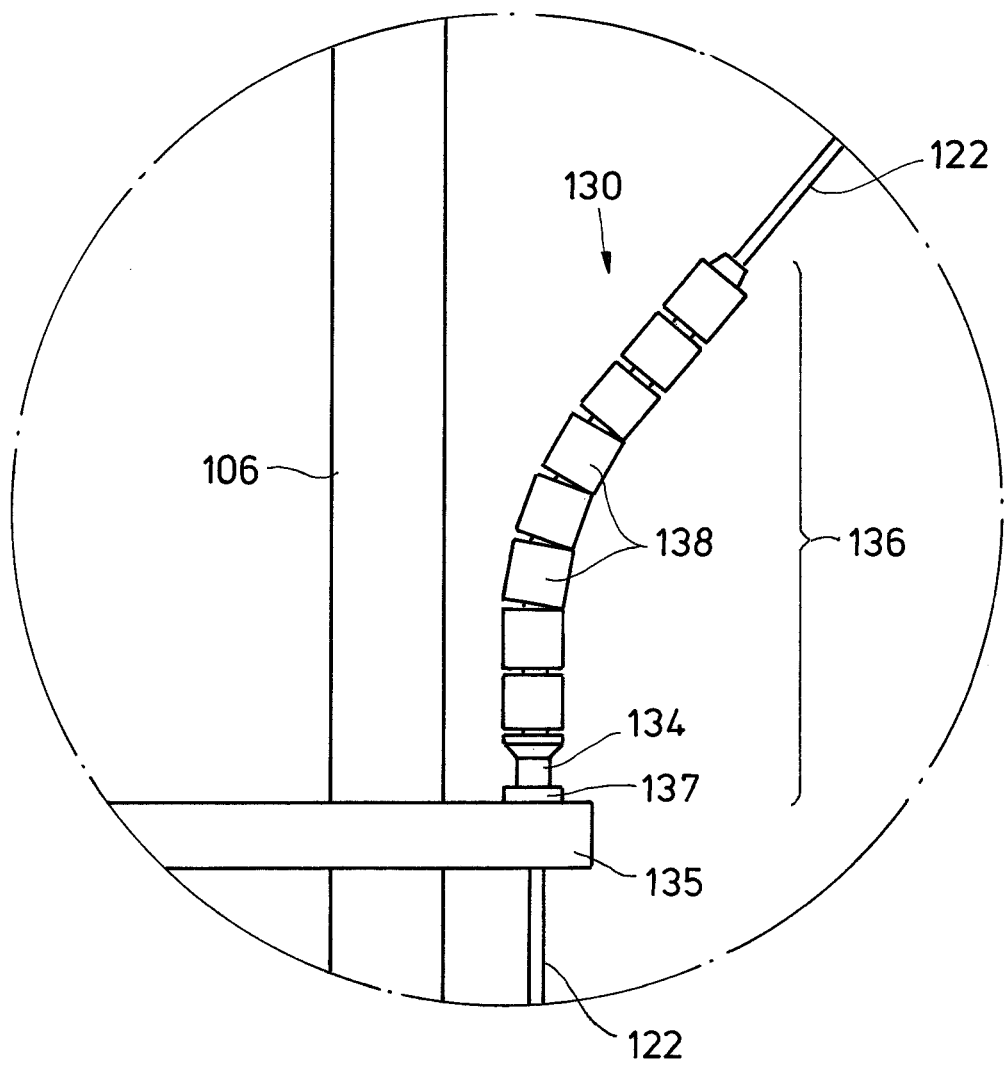
FIG. 1B is a detailed view of a portion 1B of the offshore wellsite of FIG. 1A depicting a cable support assembly positioned about the cables.

FIGS. 1A and 1B depict an example environment in which subject matter of the present disclosure may be utilized. As shown, FIGS. 1A and 1B depict an offshore wellsite 100. While an offshore wellsite is depicted, the subject matter of the present disclosure may be used about any wellsite, including a land-based wellsite and/or non-wellsite applications.

As shown in FIG. 1A, the wellsite 100 has a platform 102 and subsea equipment 104, with a riser 106 therebetween. The platform 102 has a rig 108 and other surface equipment 110 for operating the wellsite 100. The subsea equipment 104 is positioned about a wellhead 112 located on sea floor 114 adjacent a wellbore 116. The subsea equipment 104 is schematically depicted as a box adjacent the wellhead 112, but may be positioned about the sea floor 114, and may include various subsea components, such as strippers, blowout preventers, manifolds and/or other subsea devices for performing subsea operations.

The riser 106 may be a drill through umbilical line between the subsea equipment and the rig 108 at the surface. The riser 106 includes riser portions 118 that connect to form the riser 106 for joining the rig 108 on the platform 102 to the subsea equipment 104 on the sea floor 114. The riser 106 may also be provided with one or more external cables 122, such as electrical or fluid cable (e.g., multiplexer (MUX), choke and kill, glycol, hydraulics, electrical, riser-fill-up, an/d or other wellsite tubulars), for performing various functions, such as passing signals (e.g., electrical and/or communication) and/or cable materials (e.g., fluids) between the platform 102 and the subsea equipment 104.

The cable(s) 122 may run along the riser 106 from the platform 102 to the subsea equipment 104. The cables 122 may be used to pass cable materials, such as power, fluids, signals, data, commands, and/or other items, between surface equipment 110 at the platform 102 and the subsea equipment 104. The surface equipment 110 may include a surface unit 124 including processing, control and/or communication equipment for operation of the wellsite 100. A source 132 may also be positioned at the wellsite for providing the cable materials for passage about the wellsite via the cables 122. The control room 124 may be used to monitor, control, process, and/or analyze wellsite operations and the cable materials.

As shown in FIGS. 1A and 1B, a cable support assembly 130 may be positioned about the cable 122 to support the cable 122 in position about the riser 106 as shown and/or about other portions of the wellsite, such as the platform 102, the subsea equipment 104, and/or other components of the wellsite. The cable support assembly 130 may be positionable about the cable 122, for example, where the cable 122 connects to a wellsite component, such as the surface platform 102, subsea equipment 104, and/or other wellsite component.

As shown in the detail in FIG. 1B, the cable support assembly 130 may be positionable about the cable 122 to support the cable 122 therein, to prevent the cable 122 from bending beyond a desired range, and/or to support the cable 122 in connection with the wellsite component (e.g., riser 106 and/or platform 102).

The cable support assembly 130 includes a support (or cable) connector 134 and a segment chain 136. The segment chain 136 includes a plurality of cable segments 138. The support connector 134 may be at the end 137 of the segment chain 136 and operatively connected to a wellsite component, such as riser 106 as shown in FIG. 1B. As shown, the support connector 134 connects an end of the cable support assembly 130 to a riser connector 135.

In some cases, the cable support assembly 130 may be positioned about the cable 122 without requiring the use of a support connector 134 or where one of the plurality of cable segments 138 acts as the support connector 134. A support connector 134 may be provided at both ends as needed. One or more support connectors 134 may be provided to connect various portions of the cable support assembly 130 (e.g., about a wellsite component, such as riser 106).

Two or more cable segments 138 may be connected to form one or more segment chains 136 positionable about one or more portions of the cable 122. The cable segments 138 may be movable relative to each other to provide sufficient flexibility to permit the cable 122 to bend as needed to operatively support the cable 122 between the platform 102 and subsea equipment 104, and/or to limit bending to prevent damage and/or obstruction to the cable 122.

Figure 2A:
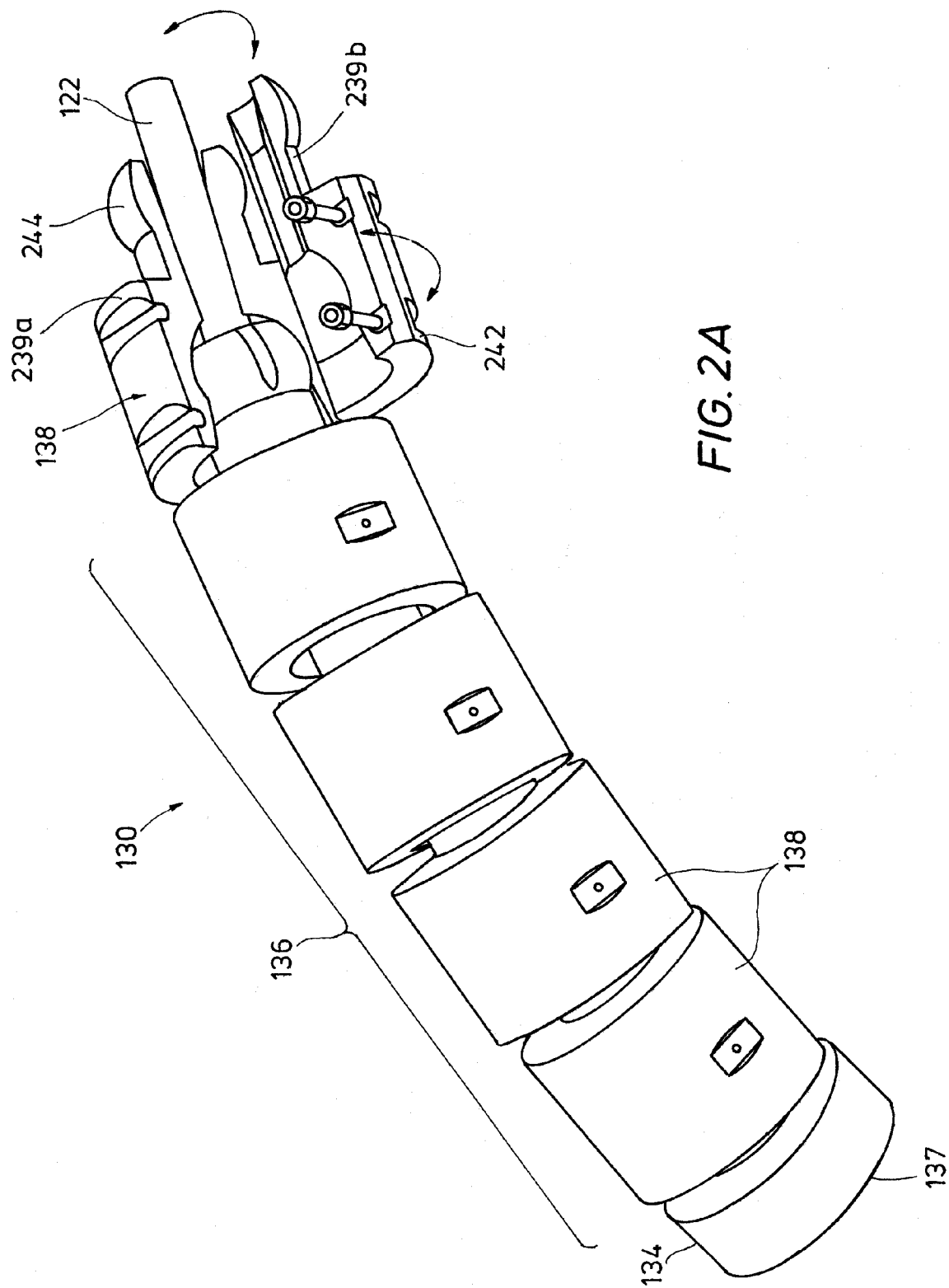
FIGS. 2A and 2B are schematic views of a cable support assembly including a plurality of clam segments.
Figure 2B:
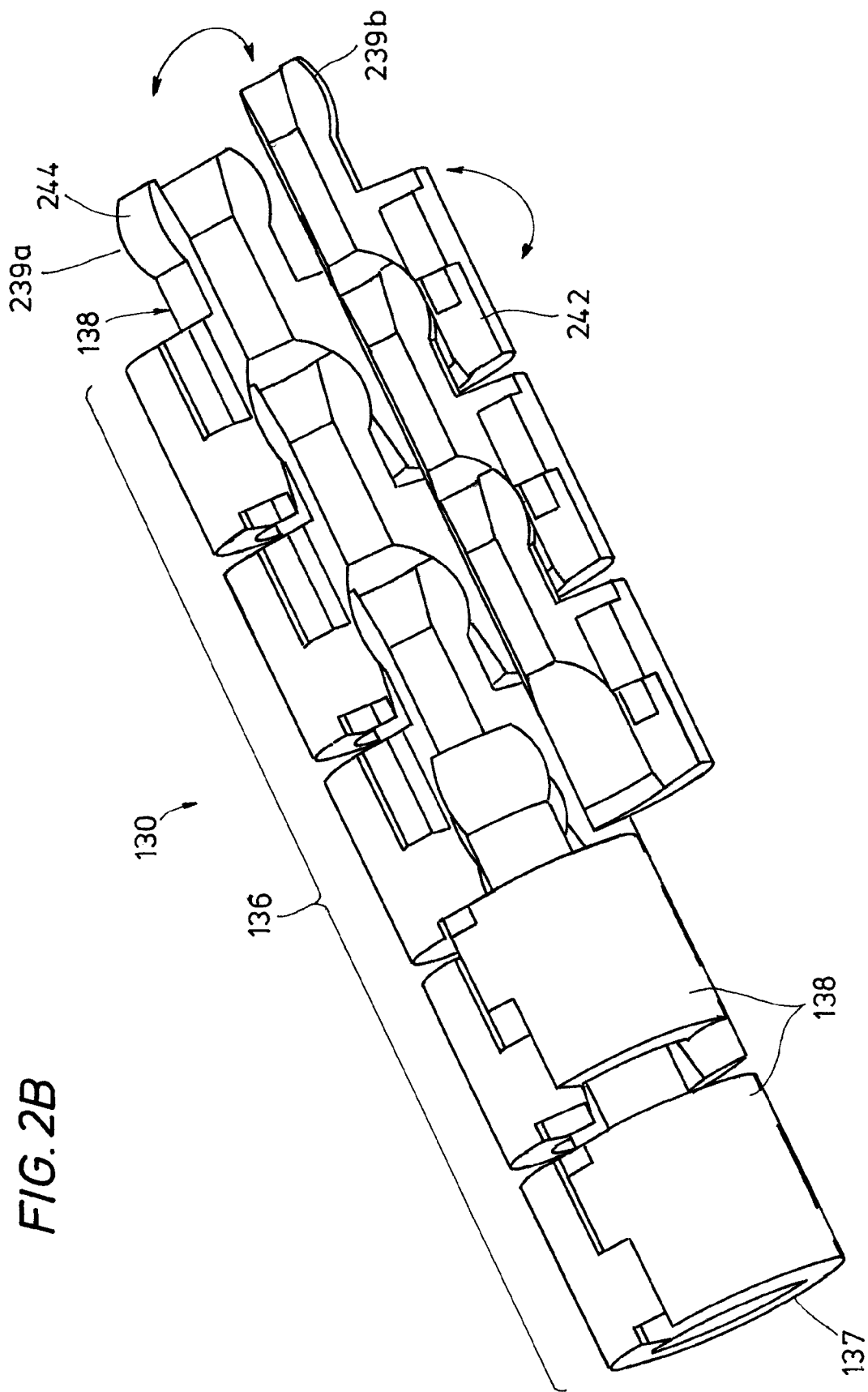
Figure 3A:
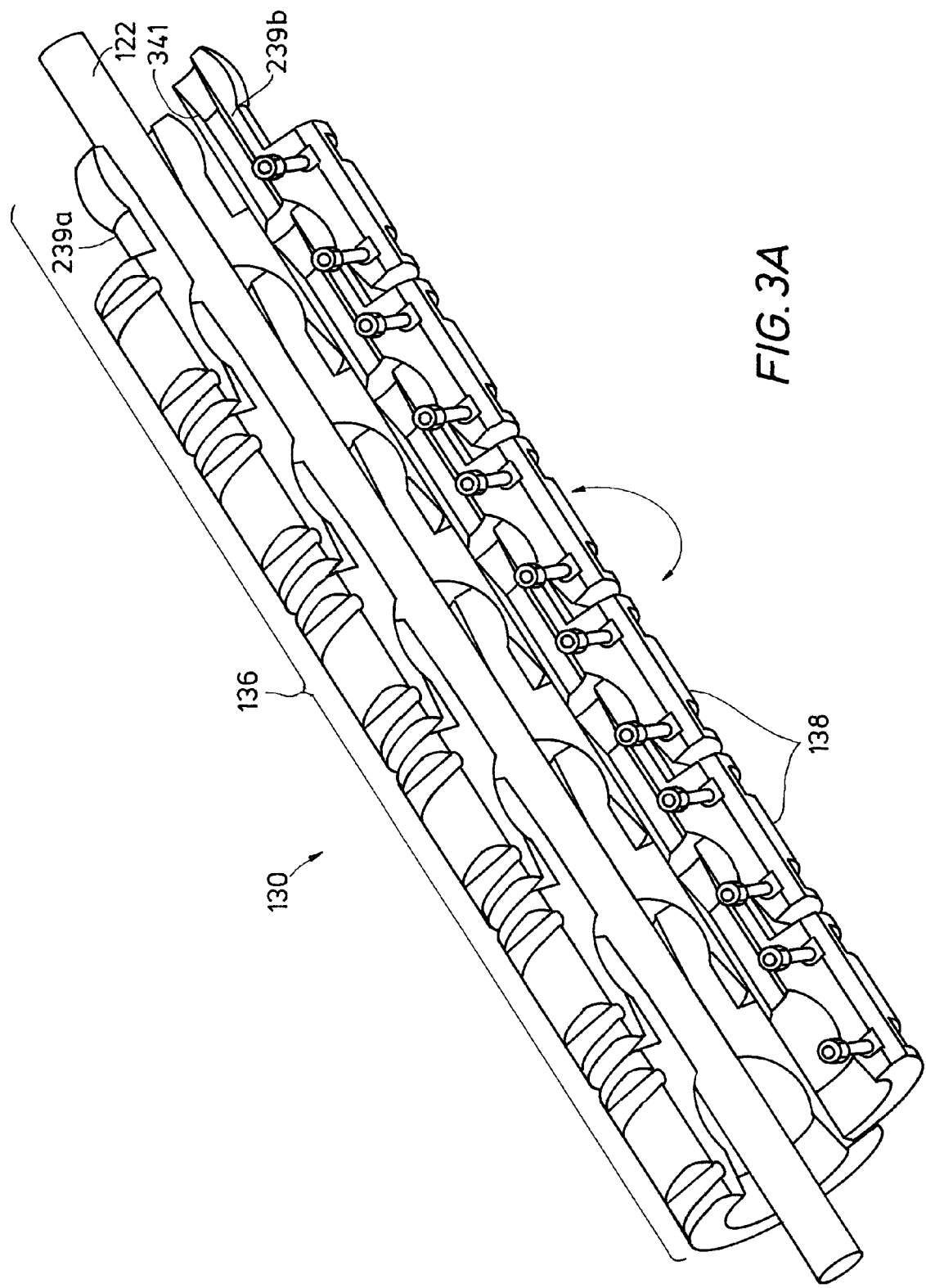
FIGS. 3A-3B are schematic views of a cable support assembly with a cable in an inserted and removed position, respectively.
Figure 3B:
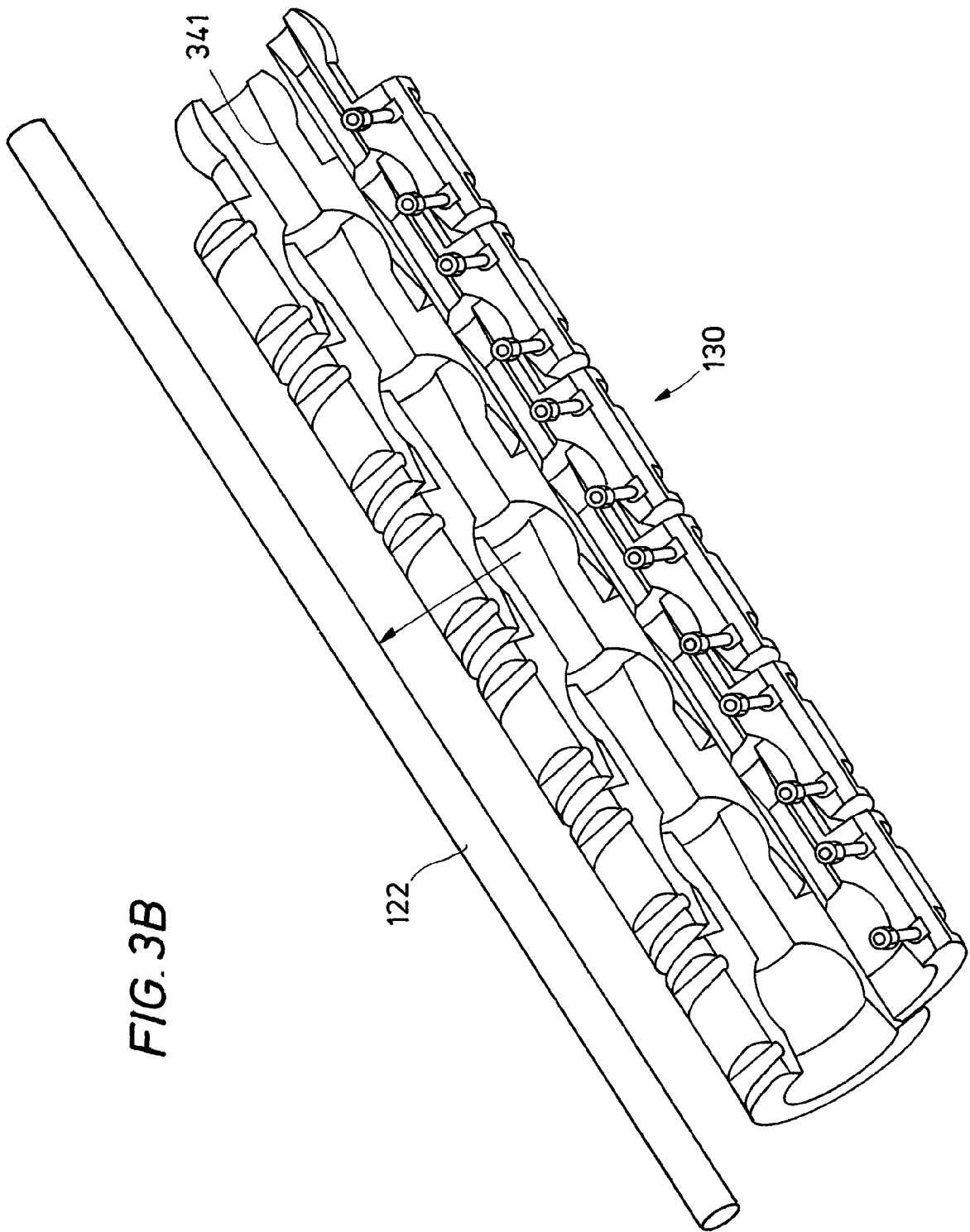

FIGS. 2A-2B and 3A-3B show the cable support assembly 130 in various positions about the cable 122. FIG. 2A shows a perspective view of the cable support assembly 130 with a cable segment 138 at a top end open, and the remaining cable segments 138 closed about the cable 122. FIG. 2B shows a perspective view of the cable support assembly 130 with two cable segments 138 at a bottom end of the chain of cable segments 136 closed, the remaining cable segments 138 open, and the cable 122 removed. FIGS. 3A and 3B show the cable support assembly 130 opened with the cable 122 in an inserted and removed position, respectively, thereabout.

The cable segments 138 may be interlockingly engaged to fit together for interaction therebetween. An insert portion 244 of the cable segments 138 is receivable into a base portion 242 of an adjacent cable segment 138. The segment chain 136 of cable segments 138 may be formed by inserting a series of the insert portion 244 into corresponding base portions 142 of adjacent cable segment 138 to form a chain. A desired number of the cable segments 138 may be connected to provide a select length of a segment chain 136 about the cable 122. One or more segment chains 136 may be positioned about one or more cables 122.

As shown in FIG. 2A, each of the cable segment 138 may have portions (or axial segments) 239a,b that are movable between an open and closed position about cable 122. In the version shown, the portions 239a,b are pivotally connected to provide a clam movement about the cable. In the closed position, the portions 239a,b surround the cable 122. The portions 239a,b are hingedly connected on one axial side to provide a claim type movement about the cable 122 and closable along another axial side. The segments as shown include two asymmetrical segments adjoined along the axial sides with the axial sides parallel to an axis of the body.

The cable segments 138 may slide up and down with respect to adjacent cable segments 138. As shown in FIG. 2B, a bottom cable segment 138 and an adjacent cable segment 138 at an end 137 are shown as closed. The cable segment 138 adjacent to the bottom cable segment 138 is slid away from a bottom end 137 of the segment chain 136. During assembly, the adjacent cable segment 138 may be slid down to pin the two bottom cable segments 138 together. Each subsequent cable segments 138 along the segment chain 136 may be assembled in this manner. A final one of the cable segments 138 at an end of the segment chain 136 may be bolted together and/or secured by some other means. As shown the support connector 134 is provided at an end 137 for connection to a wellsite component as shown in FIG. 1B.

As demonstrated by FIGS. 3A-3B, one or more of the cable segments 138 define a cable cavity (or channel) 341 therein to receive the cable 122. The interlocking cable segments 138 the cable support assembly 130 are arranged so that they may be selectively opened simultaneously to access the cable 122 therein. The cable support assembly 138 may be selectively opened to facilitate installation, removal, adjustment, and/or service of the cable 122.

The cable segment 138 may be opened in series by opening the cable segments 138 one at a time starting from a top end as shown in FIG. 2A. All of the cable segments 138 of the cable support assembly 130 may be opened simultaneously as shown in FIGS. 3A and 3B to insert, remove, and/or access the cable 122. The cable segments 138 interlock such that all of the cable segments 138 may be opened simultaneously by opening any cable segment 138 other than the cable segment 138 adjacent the top end thereof. The support connector 134 (FIG. 2) may optionally open with the cable assembly 130. The support connector 134 may have connection devices, such as bolts or other connectors (not shown), to secure the support connector 134 to a wellsite component.

FIGS. 4A and 4B show segment chains 436a,b including adjacent cable segments 138, 138' interlockingly connected. FIG. 4A shows a key configuration. FIG. 4B shows a threaded configuration. As also shown by these figures, the cable segments 138 are provided with an aligner (or alignment mechanisms or devices) 446a,b to orient the adjacent cable segments 138, 138' in an aligned position. The cable segments 138, 138' may be aligned such that the segment chains 436a,b may be opened simultaneously as shown in FIG. 3B.

In the key configuration of FIG. 4A, the insert portion 244 of the cable segments 138 is provided with a keyway (or channel) 448 and the base portion 242 of an adjacent cable segment 138 is provided with a corresponding key 450. The key 450 is insertable into the keyway 448 to prevent rotation of the cable segment 138 relative to the adjacent cable segment 138. This anti-rotation may be used to axially align the cable segments 138 such that the segment chain 436a can open in unison.

The keyway 448 may have a radial width W to permit a certain amount of radial movement of the key 450 therein. The width W may be limited to a range to permit the adjacent segments 138 to open in unison. The keyway 448 may also have an axial length L to permit the key 450 to move a distance axially therein. The length L may also permit spacing S between the segments to vary. Additionally, the base portion 242 has a cavity 443 to receive the insert portion 244. The cavity 443 may be in fluid communication with the cable cavity 341. Dimensions of the cavity 443 relative to the insert portion 244 may be adjusted to selectively permit a desired amount of movement therebetween (e.g., via space S).

The axial movement of the key 450 may permit axial movement of the cable segments 138 to permit some flexibility in movement of the cable 122 therein as indicated by the curved arrows. Ends 452 of the base portion 242 may be angled to permit additional flexibility in movement therebetween. Dimensions of the cable segments 138 may be adjusted to provide the desired movement, flexibility or inflexibility.

In the threaded configuration of FIG. 4B, the cable segments 138' are connected by a thread 454. The thread 454 is disposed through a hole 456 extending through the base portion 242 of the adjacent cable segments 138'. The dimension of the hole 456 and/or tension on the thread 454 may be selectively adjusted to permit the flexibility between the cable segments 138'. The thread 454 may be secured at opposite ends of the segment chain 436b of the cable segments 138'.

FIGS. 5A-5C show various views of the cable segment 138. As shown in these views, the cable segment 138 has an interlocking ball and socket configuration that permits universal movement between the cable segments 138. The universal movement may be limited by, for example, the alignment mechanisms device and/or spacing S between cable segments as shown in FIGS. 4A and 4B and/or by the dimensions of the cable segments 138.

The insert portion 244 includes a ball end 558 and a neck 560 extending from the base portion 242. The base portion 242 has a corresponding ball portion 562 and neck portion 564 of the cable cavity 341. A clearance between portions of the insert portion 244 and the base portion 242 may be selected to adjust movement therebetween, for example, to increase/decrease flexibility about the cable 122. The ball end 558 and ball portion 562 is depicted as having a partial spherical shape for movement therebetween. The configuration of the cable segment 138 may permit other geometries (e.g., polygonal) of the insert portion 244 and/or base portion 242 to permit universal movement therebetween.

As also shown by these views, the cable segments 138 have an offset configuration. The offset configuration means that the segment portions 239a,b may be non-symmetrical. As shown, the portions are sections vertically sliced along axial lines about the cable segment 138. The segment portions 239a,b may be defined by cutting the cable segments 138 along axial lines with offset radial angles α,β about an axis X of the cable segment 138 such that segment portion 239a is larger than segment portion 239b. In the example shown in FIGS. 5A-5C, the larger segment portion 239a is similar to the smaller segment portion 239b, except that the larger segment portion 239a includes about 240 degrees of the segment 138 and the smaller portion 239b includes about 120 degrees of the segment 138. The angles α,β of the respective segment portions 239a,b may be selected to provide the desired movement therebetween while permitting the cable segments 138 to open and close individually or simultaneously as shown, for example, in FIGS. 3A-3C.

The smaller segment portion 239b is pivotally connected to the larger segment portion 239a by a hinge 566. As shown, the hinge 566 pivotally connects the segment portions 239a,b along adjacent edges of the base portion 242. One or more hinges 566 or other means may be provided to pivotally connect the segment portions 239a,b. In some cases, no hinge or pivotal connection may be provided and the smaller segment portion 239b may releasable from the larger segment portion 239a without a pivotal connection therebetween.

As also shown by FIGS. 5A-5C, the segment portions 239a,b may optionally secured in the closed position of FIGS. 5A and 5B by a bolt lock 563. As shown, the lock 563 includes bolts 561 extending through holes 565 in both segment portions 239a,b to threadedly and/or releasably connect the segment portions 239a,b together. In the example shown, two bolts 565 are disposed about a depression along an outer surface of the cable segment 138. The two bolts 565 extend through the first segment 239a and threads to a second cable portion 239b and/or nut. While a threaded bolt 565 is depicted, one or more locks having one or more connection devices, such as screws, bolts, latches, or other connector, may be used.

FIGS. 5D-5F depict another version of the clam segment 138" having a rotating lock 563'. The clam segment 138" is depicted as being the same as clam segment 138 of FIGS. 5A-5C, except with a different lock 563'. FIG. 5D show the clam segment 138" in a closed position. FIG. 5E shows the clam segment 138" in an open position with the rotating lock 563' in an open position. FIG. 5F shows the clam segment 138" in an open position with the rotating lock 563' in a lock position.

As shown, the lock 563' includes a latch 568 about portion 239b and a rod 572 positioned about portion 239b between arms 574. The latch 568 is lockingly engageable with the rod 572. As shown in FIG. 5E, the latch 568 is in an open position to define a channel 570 to receive the rod 572 when the segments 239a,b come together. Once the rod 572 is inserted into the channel 570, the latch 568 may be rotated to the closed position about the rod 572. The latch 568 may rotate about 180 degrees between the open and locked positions of FIGS. 5E and 5F, respectively. While a rotating latch 568 engageable with a rod 572 is depicted, one or more latches or other connection devices may be used.

FIGS. 6A and 6B show another variation of the cable segment 138''' formed from multiple segment portions 239a1, a2, b. The cable segment 138''' is similar to the cable segment 138 of FIGS. 5A-5C, except with multiple segment portions. As shown by these figures, two or more segment portions may be used. When using more than two segment portions, at least some of the segment portions may be secured together such that an offset portion of the segment portions may be selectively opened to provide simultaneous opening of a plurality of interconnected cable segments 138''' as shown in FIG. 3B. The segment portions may be pivotally connectable by hinges 566 or locks 563, 563' such that the segment portions 239a1, a2, b may selectively open as desired.

In the example shown, segment portions 239a1 and 239a2 may be hinged together by hinge 566 to provide a combined large segment 239a that is offset from smaller segment 239b. Segment portions 239a1 and b may be interlocked using the locks 563' to permit selective opening therebetween. With the multi-segment configuration, the cable segment 138''' may have symmetric cable portions 239a1,a2,b2 as shown, or one or more non-symmetric portions. Any number of segments may be combined and selectively openable to provide the offset configuration.

The segments may include at least two asymmetrical segments adjoined along the axial sides, with the axial sides parallel to an axis of the body. As shown in FIGS. 6A and 6B, the segments comprises three axial segments. The three axial segments adjoined along the axial sides, with two of the three axial sides hingedly connected, one of the three axial sides openable.

Figure 7:
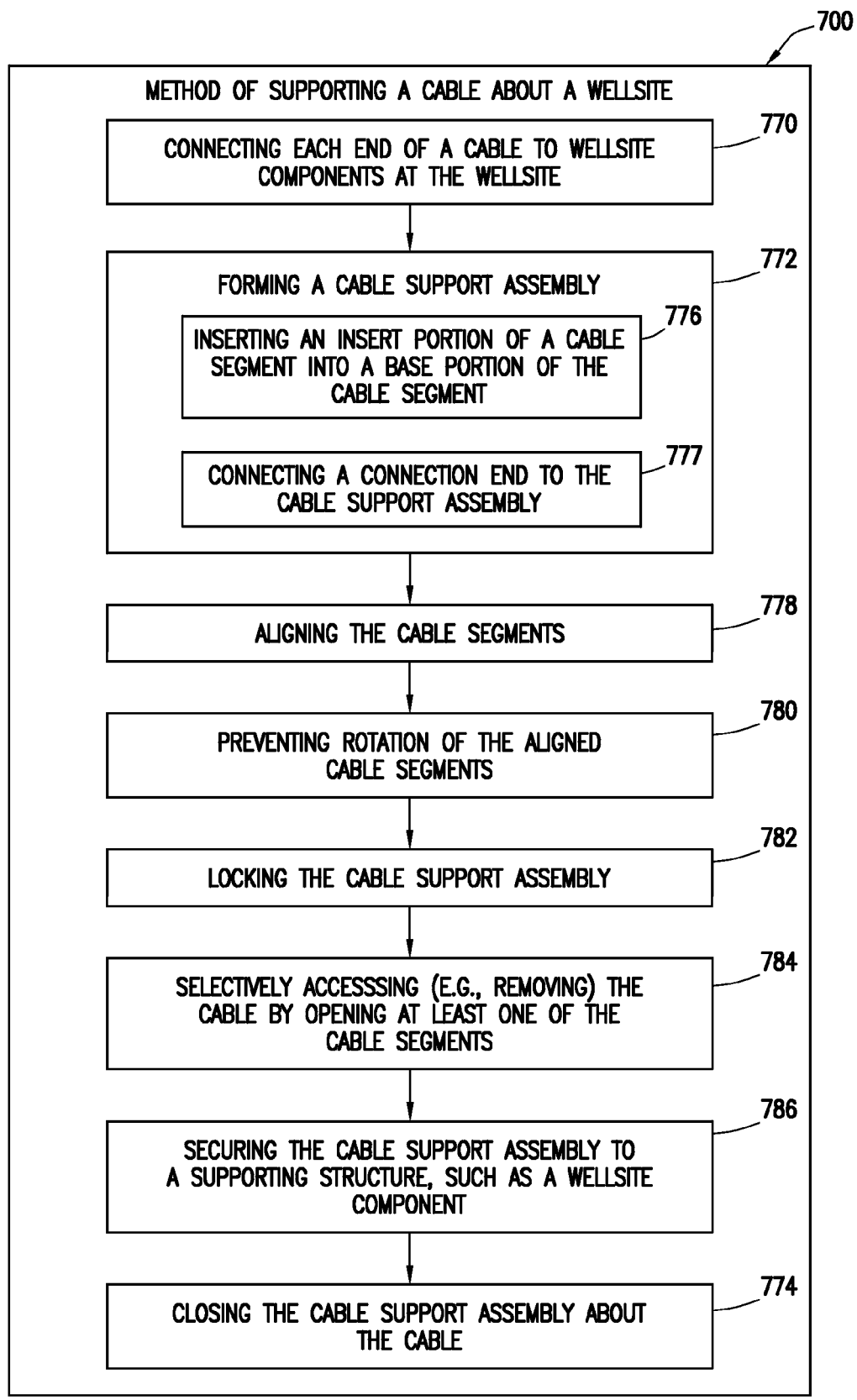
FIG. 7 is a flow chart depicting a method of supporting a cable about a wellsite.

FIG. 7 is a flow chart depicting a method 700 of supporting a cable about a wellsite. The method 700 involves connecting 770 each end of a cable to wellsite components at the wellsite, forming 772 a cable support assembly, and closing 774 the cable support assembly about the cable.

The forming 772 may involve inserting 776 an insert portion of a cable segment into a base portion of the cable segment. Two or more cable segments may be joined by repeating the inserting for a series of adjacent cable segments. The portions of the cable segments (e.g., the larger portions oriented roughly 90 degrees to the smaller than 180 degree portions) may be aligned, for example, by rotating the insert portion of a first cable segment within the base portion of adjacent cable segments.

Optionally, the method may involve aligning 778 the cable segments, preventing rotation 780 of the aligned cable segments, locking 782 the cable support assembly, selectively accessing (e.g., removing) 784 the cable by opening at least one of the cable segments, and/or securing 786 the cable support assembly to a supporting structure, such as a wellsite component. The preventing rotation 780 may involve inserting the alignment device through the adjacent cable segments. The locking 782 may involve locking one or more of the cable segments in a closed position.

The methods may be performed in any order, and repeated as desired.

It will be appreciated by those skilled in the art that the techniques disclosed herein can be implemented for automated/autonomous applications via software configured with algorithms to perform the desired functions. These aspects can be implemented by programming one or more suitable general-purpose computers having appropriate hardware. The programming may be accomplished through the use of one or more program storage devices readable by the processor(s) and encoding one or more programs of instructions executable by the computer for performing the operations described herein. The program storage device may take the form of, e.g., one or more floppy disks; a CD ROM or other optical disk; a read-only memory chip (ROM); and other forms of the kind well known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial here. Aspects of the subject matter may also be configured to perform the described functions (via appropriate hardware/software) solely on site and/or remotely controlled via an extended communication (e.g., wireless, internet, satellite, etc.) network.

While the embodiments are described with reference to various implementations and exploitations, it will be understood that these embodiments are illustrative and that the scope of the inventive subject matter is not limited to them. Many variations, modifications, additions and improvements are possible. For example, the various numbers of cable segments and/or chains of cable segments with or without cable connectors may be provided about one or more portions of the wellsite. Various combinations of cable segments and/or assemblies may also be used for cables offsite.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A cable support positionable about a cable of a wellsite, the cable support comprising:
   a body having a base portion and a ball portion with a cable channel to receive the cable therethrough, the body comprising a plurality of axial segments movable between an open position to access the cable channel and a closed position to enclose the cable in the cable channel, the plurality of axial segments comprising at least one offset axial segment having a different dimension from a reminder of the plurality of axial segments to define an asymmetric enclosure about the cable along an axis thereof;
   wherein the base portion has a cavity to receive the ball portion of another cable support whereby the cable is flexibly supported.

2. The cable support of claim 1, wherein the body has a neck portion between the base portion and the ball portion.

3. The cable support of claim 1, wherein the body further comprises a key and a keyway, the key interlockingly engageable with the keyway of the another cable support.

4. The cable support of claim 3, wherein the key is movable in the keyway to permit movement about the another cable support.

5. The cable support of claim 1, further comprising a thread disposable through the body and the body of the another cable support.

6. The cable support of claim 1, further comprising an aligner operatively connecting the body with the body of the another cable support in a predefined orientation.

7. The cable support of claim 1, wherein the plurality of axial segments are hingedly connectable along a first axial side and connectable along a second axial side.

8. The cable support of claim 7, wherein the plurality of axial segments comprise at least two asymmetrical segments adjoined along the axial sides, the axial sides parallel to an axis of the body.

9. The cable support of claim 8, wherein the plurality of axial segments comprises three axial segments, the three axial segments adjoined along the axial sides, two of the three axial sides hingedly connected, one of the three axial sides openable.

10. The cable support of claim 1, further comprising a hinge between the plurality of axial segments.

11. The cable support of claim 1, further comprising a lock removably connecting the plurality of axial segments.

12. The cable support of claim 11, wherein the lock comprises bolts removably connecting the plurality of axial segments.

13. The cable support of claim 11, wherein the lock comprises a rod with a latch removably connecting the plurality of axial segments.

14. A cable support assembly positionable about a cable of a wellsite, the cable support assembly comprising:
   a plurality of cable supports, each of the plurality of cable supports comprising:
      a body having a base portion and a ball portion with a cable channel to receive the cable therethrough, the body comprising a plurality of axial segments movable between an open position to access the cable channel and a closed position to enclose the cable in the cable channel, the plurality of axial segments comprising at least one offset axial segment having a different dimension from a reminder of the plurality of axial segments to define an asymmetric enclosure about the cable along an axis thereof;
      wherein the base portion has a cavity to receive the ball portion of another cable support whereby the cable is flexibly supported.

15. The cable support assembly of claim 14, further comprising a support connector operatively connectable between the body and a wellsite component.

16. The cable support assembly of claim 14, wherein the plurality of cable supports are connectable to form a chain of the plurality of cable supports about the cable.

17. The cable support assembly of claim 14, further comprising an aligner to align the plurality of cable supports, the plurality of cable supports openable at one of simultaneously or sequentially.

18. A method of supporting a cable of a wellsite, comprising:
   providing a plurality of cable supports comprising a body having a base portion and a ball portion with a cable channel therethrough, the body comprising a plurality of axial segments, the plurality of axial segments comprising at least one offset axial segment having a different dimension from a reminder of the plurality of axial segments to define an asymmetric enclosure about the cable along an axis thereof;
   positioning the ball portion of the plurality of cable supports in the base portion of adjacent ones of the plurality of cable supports;
   positioning the cable in the cable channel; and
   enclosing the cable in the cable channel by moving the plurality of axial segments to a closed position thereof.

19. The method of claim 18, further comprising locking the plurality of axial segments in the closed position.

20. The method of claim 18, further comprising moving the plurality of axial segments of the plurality of cable supports to an open position.

21. The method of claim 20, wherein the moving comprises opening the plurality of axial segments simultaneously or sequentially.

* * * * *